US012609517B2

(12) United States Patent
Hirose et al.

(10) Patent No.: US 12,609,517 B2
(45) Date of Patent: Apr. 21, 2026

(54) WIRING COMPONENT FOR ELECTRICAL EQUIPMENT

(71) Applicant: Mitsubishi Electric Corporation, Tokyo (JP)

(72) Inventors: Yuki Hirose, Tokyo (JP); Mitsuo Sone, Tokyo (JP); Akifumi Shimono, Tokyo (JP); Taigi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 18/570,147

(22) PCT Filed: Jul. 27, 2021

(86) PCT No.: PCT/JP2021/027658
§ 371 (c)(1),
(2) Date: Dec. 14, 2023

(87) PCT Pub. No.: WO2023/007571
PCT Pub. Date: Feb. 2, 2023

(65) Prior Publication Data
US 2024/0275153 A1 Aug. 15, 2024

(51) Int. Cl.
H02G 5/06 (2006.01)
(52) U.S. Cl.
CPC ..................................... H02G 5/06 (2013.01)
(58) Field of Classification Search
CPC .. H02G 5/04; H02G 5/06; H02G 3/14; H02G 3/0418
See application file for complete search history.

(56) References Cited

U.S. PATENT DOCUMENTS

| 6,333,463 B1 * | 12/2001 | Bukovnik | ............ H02G 15/003 174/92 |
| 2002/0002961 A1 | 1/2002 | Yuasa et al. | |
| 2021/0280350 A1 * | 9/2021 | Grubl | ...................... H01F 1/113 |
| 2023/0012536 A1 * | 1/2023 | Yamahira | ............... H02K 5/225 |

FOREIGN PATENT DOCUMENTS

JP       2002-027636 A       1/2002

OTHER PUBLICATIONS

International Search Report for PCT/JP2021/027658 dated Oct. 19, 2021 (PCT/ISA/210).

* cited by examiner

*Primary Examiner* — Chau N Nguyen
(74) *Attorney, Agent, or Firm* — Sughrue Mion, PLLC

(57) ABSTRACT

A wiring component for electrical equipment comprises a plurality of bus bars, a housing made of resin in which the plurality of bus bars are each exposed at both ends and embedded inside at an interval to each other, and a hollow portion is provided in which an opening through which an intermediate portion of each of the plurality of bus bars is exposed is formed, a filling material made of an elastomer filled in the hollow portion and covering an entire periphery of the bus bars at least at a boundary portion between the intermediate portions and the housing, and a lid member including a lid portion that closes the opening and an embedded portion that extends from the lid portion toward the filling material and is embedded in the filling material.

14 Claims, 12 Drawing Sheets

WIRING COMPONENT FOR ELECTRICAL EQUIPMENT

CROSS REFERENCE TO RELATED APPLICATIONS

This application is a National Stage of International Application No. PCT/JP2021/027658 filed Jul. 27, 2021.

TECHNICAL FIELD

The present application relates to a wiring component for electrical equipment.

BACKGROUND ART

In order to promote the reduction of the number of wire harnesses for electrical equipment, the reduction of wire diameters, and the electrification for mechanically operated parts (power steering, engine intake and exhaust devices) in an internal combustion passenger car, it is desirable to boost the voltage to a voltage higher than the rated voltage 12 V. In this case, when a circuit to which the rated voltage 12 V and the boosted high voltage are applied is provided in a circuit of an electrical connection box that distributes the power, a leakage current due to the potential difference is likely to occur. Therefore, a circuit unit having a structure in which an insulating resin is filled between a low-voltage bus bar and a high-voltage bus bar and between high-voltage bus bars, in which a leakage current is likely to occur, for preventing the occurrence of the leakage current has been disclosed (for example, refer to Patent Document 1).

CITATION LIST

Patent Document

Patent Document 1: Japanese Patent Application Laid-Open No. 2002-27636 (paragraphs 0015 to 0022, FIG. 1 to FIG. 3)

SUMMARY OF INVENTION

Problems to be Solved by Invention

However, since the metal bus bar and the filled resin have different linear expansion coefficients, a minute gap may be generated due to displacement caused by a temperature change. Therefore, when the bus bar is exposed to the outside, there is a possibility that liquid such as water entering from one end side through the minute gap advances toward the other end side, and a leakage current is generated at the other end side connected to another equipment.

The present application discloses a technique for solving the above-described problem, and an object of the present application is to obtain a highly reliable wiring component for electrical equipment that prevents a leakage current.

Means for Solving Problems

A wiring component for electrical equipment disclosed in the present application includes, a plurality of bus bars, a housing made of resin in which the plurality of bus bars are each exposed at both ends and embedded inside at an interval to each other, and a hollow portion is provided in which an opening through which an intermediate portion of each of the plurality of bus bars is exposed is formed, a filling material made of an elastomer filled in the hollow portion and covering an entire periphery of the bus bars at least at a boundary portion between the intermediate portions and the housing, and a lid member including a lid portion that closes the opening and an embedded portion that extends from the lid portion toward the filling material and is embedded in the filling material.

Advantageous Effect of Invention

According to the wiring component for electrical equipment disclosed in the present application, since at least the boundary portion between the intermediate portions of the bus bars and the housing is covered with the elastomer, it is possible to obtain a highly reliable wiring component for electrical equipment that prevents a leakage current caused by a gap between the bus bars and the housing.

MODE FOR CARRYING OUT INVENTION

Embodiment 1

Figure 1A:
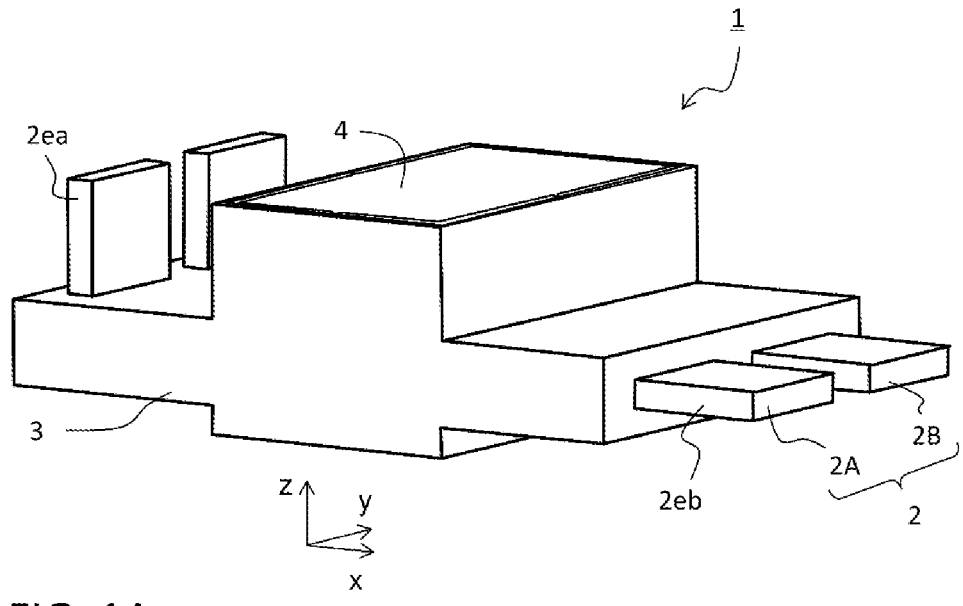
FIG. 1A and FIG. 1B are, respectively, a perspective view of a wiring component for electrical equipment and a perspective view in which a part of the component is see-through, according to Embodiment 1.
Figure 1B:
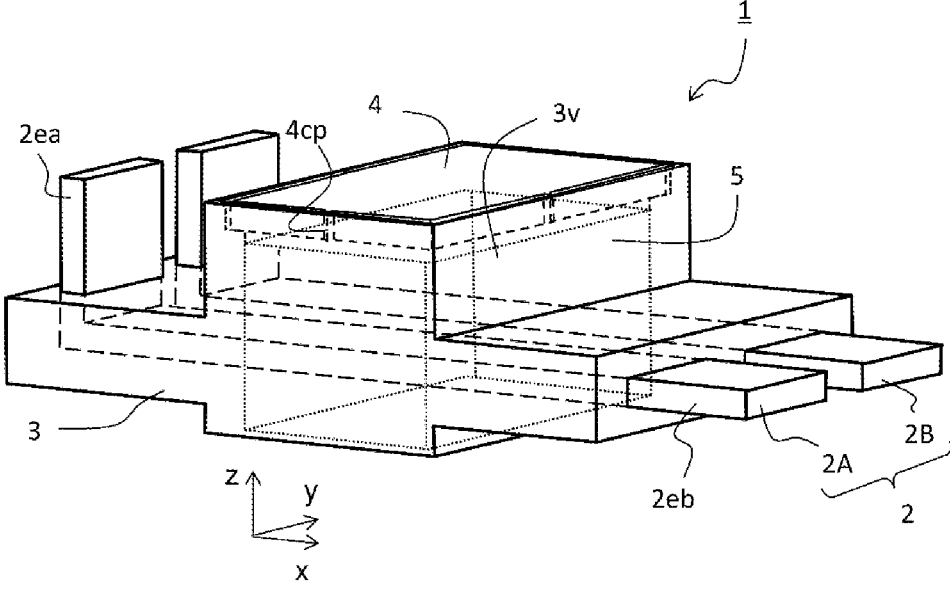
Figure 2:
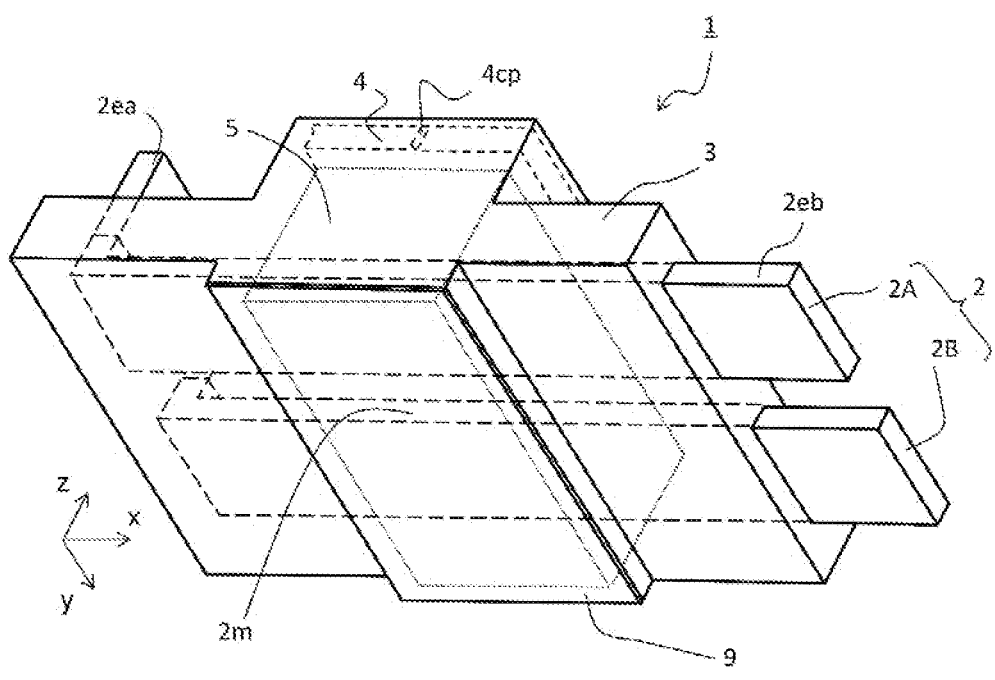
FIG. 2 is a perspective view of the wiring component for electrical equipment in which a part thereof is see-through, according to Embodiment 1.
Figure 3:
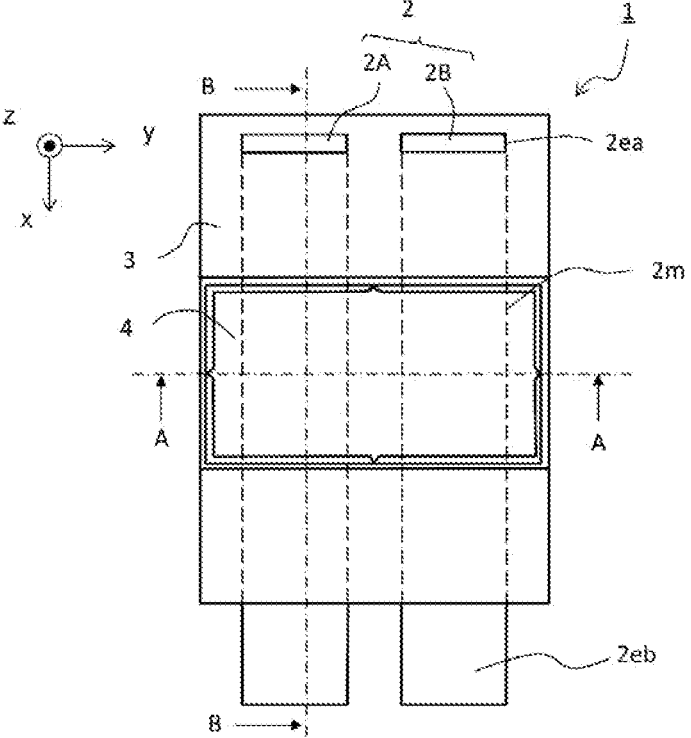
FIG. 3 is a plan view of the wiring component for electrical equipment according to Embodiment 1.
Figure 4A:
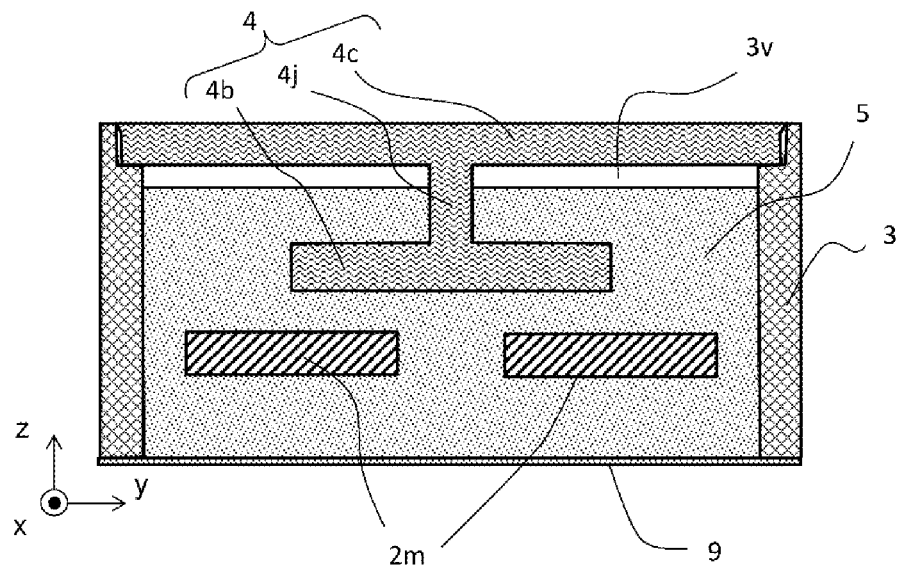
FIG. 4A and FIG. 4B are each a different cross-sectional view in a cross section of the wiring component for electrical equipment according to Embodiment 1.
Figure 4B:
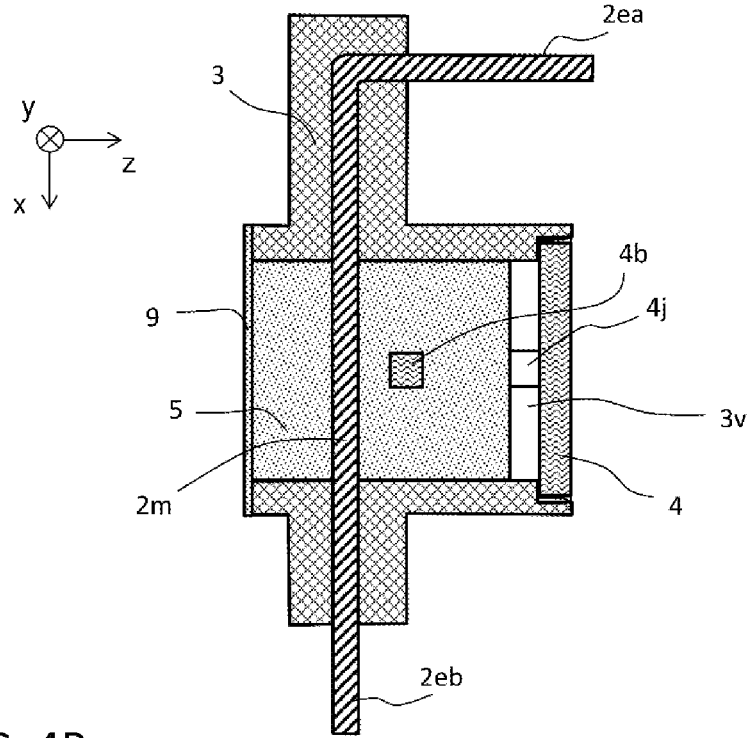

FIG. 1A, FIG. 1B to FIG. 4A, and FIG. 4B are for describing a configuration of a wiring component for electrical equipment according to Embodiment 1, FIG. 1A is a perspective view of the wiring component for electrical equipment as viewed from above, FIG. 1B is a perspective view of a housing in a see-through manner for showing a state of a lid portion and bus bars from the same viewpoint as FIG. 1A, and FIG. 2 is a perspective view of the housing in a see-through manner for showing a state of the lid portion and the bus bars when the wiring component for electrical equipment is viewed from below. Further, FIG. 3 is a plan view of the housing in a see-through manner for showing a state of the bus bars of the wiring component for electrical equipment, FIG. 4A is a cross-sectional view corresponding to a line A-A of FIG. 3, and FIG. 4B is a cross-sectional view corresponding to a line B-B of FIG. 3.

Before describing the configuration of the wiring component for electrical equipment 1 according to each embodiment of the present application, a basic configuration and a usage mode common to a typical wiring component for electrical equipment will be described. The basic configuration is that, as shown in FIG. 1A and FIG. 3, both ends (end portion 2_ea_, end portion 2_eb_) of a bus bar 2 whose intermediate portion is embedded in the housing 3 protrude from the housing 3. In many cases, for example, in a state where one end (end portion 2_ea_) is connected to another equipment that requires hermeticity or a wiring component, the other end (end portion 2_eb_) is exposed to the outside and used.

Therefore, water should not be allowed to enter another equipment connected through the wiring component for electrical equipment 1. For example, when the wiring component for electrical equipment having a gap between the bus bar and the resin described in the background art is used in a severe environment in which a rapid temperature change is repeated, a pressure difference occurs between the inside and the outside of the component, and thus liquid may enter the gap. Then, there is a possibility that the entered liquid becomes a path and a short-circuit failure occurs between exposed portions of the bus bars to which different voltages are applied. Therefore, a waterproof structure is required for the wiring component for electrical equipment in which the bus bars are exposed to the outside.

Therefore, the wiring component for electrical equipment 1 according to Embodiment 1 of the present application is configured such that the entire periphery of intermediate portions 2_m_ of the bus bars 2 embedded in a housing 3 by integral molding is covered with a filling material 5 made of an elastomer resin. To be specific, as shown in FIG. 1B, FIG.

2, and FIG. 4B, in the housing 3 in which the intermediate portions of the bus bars 2 are embedded with their both ends (end portion 2_ea_ and end portion 2_eb_) exposed and, a hollow portion 3_v_ that is opened in the vertical direction (z direction in the figures) and in which the intermediate portions 2_m_ of the bus bars 2 are exposed is formed. The entire periphery of the intermediate portions 2_m_ of the bus bars 2 are covered with the filling material 5 with elasticity formed by curing a potting material filled in the hollow portion 3_v_ by potting as shown in FIG. 4A.

For example, a bus bar 2 is formed of a conductor having excellent electrical conductivity such as Cu and Al, a total of two bus bars of a bus bar 2A and a bus bar 2B to which respective different voltages are applied are embedded by insert molding in the housing 3 at an interval. For the housing 3, for example, in addition to a thermoplastic resin such as polyphenylene sulfide (PPS), a thermosetting resin can also be used as long as the insert molding can be performed and the resin has strength as the housing 3.

Then, for the integrally molded product of the bus bars 2 and the housing 3, a lower opening (negative side in the z direction) of the hollow portion 3_v_ opened vertically is closed by attaching a support member 9, and the potting material is poured from an upper opening (positive side in the z direction). When the poured potting material is cured, the filling material 5 covering the intermediate portions 2_m_ is formed. Further, before the potting material is cured, a lid member 4 for closing the other opening is placed so that a portion (an embedded portion 4_b_) is embedded in the potting material, whereby the wiring component for electrical equipment 1 is completed.

Also in the wiring component for electrical equipment 1 configured as described above, since the resin material constituting the housing 3 and the metal material constituting the bus bars 2 have different linear expansion coefficients, displacement occurs between the housing 3 and the bus bars 2 due to a temperature change. At this time, since the resin material having rigidity (bending strength, tensile strength) as the housing is used for the housing 3, it is difficult to follow the displacement, and as described in the background art, a gap is generated between the housing 3 and the bus bars 2.

In contrast, since the elastomer resin like silicone rubber is used as the potting material used for the filling material 5, the potting material does not have rigidity as the housing, but has flexibility as compared with the resin constituting the housing 3, so that the potting material can follow the displacement with the bus bars 2. For this reason, at least in the portion covering the bus bars 2, no gap is formed between the bus bars 2 and the potting material.

Furthermore, the adhesion between and the housing 3 and the potting material is also good in the hollow portion 3_v_. Therefore, even if gaps between a bus bar 2 and the housing 3 are continuously formed between the end portion 2_ea_ and the hollow portion 3_v_ and between the end portion 2_eb_ and the hollow portion 3_v_, the gaps to each other are cut off by the filling material 5. Therefore, even if water enters the hollow portion 3_v_ from the end portion 2_ea_, the water does not reach the end portion 2_eb_, and vice versa.

Note that, as described above, the filling material 5 is superior to the housing 3 in followability and adhesion, that is, a function of maintaining sealing, but is lower in rigidity than the resin material constituting the housing 3. Therefore, when an external force is applied, there is a possibility that deformation, chipping, or the like occurs and the sealing is impaired. Whereas the lid member 4 is provided to close the opening of the upper portion of the hollow portion 3v and prevent an external force from being applied to the filling material 5.

The lid member 4 is made of resin having the same rigidity as that of the housing 3, and at the distal end of a columnar portion 4j extending from the lid portion 4c closing the opening toward the filling material 5, the embedded portion 4b embedded in the filling material 5 and extending in the direction (y direction) perpendicular to the extending direction (z direction) is provided. When the potting material is cured to form the filling material 5, the embedded portion 4b exhibits an anchor effect with respect to the attaching/detaching direction (z direction) of the lid member 4, and has a structure capable of preventing the lid member 4 from detaching. In addition, the lid member 4 is provided with crush ribs 4cp at intermediate portions of four sides of the lid portion 4c, and has a structure capable of being temporarily fixed with respect to the opening of the hollow portion 3v of the housing 3. Therefore, even in a state where the anchor effect of the lid member 4 is not exhibited before the potting material is cured, the lid member 4 is not easily detached.

As a result, even when a large external force is applied to the lid member 4 in an environment such as strong vibration, impact, or high-pressure car washing, the lid member 4 can be prevented from detaching and the filling member 5 can be prevented from being exposed. Note that, in order to prevent an external force from being applied to the filling material 5, the lower opening of the hollow portion 3v may be closed by the support member 9 having the same rigidity as the housing 3 or the lid member 4. In this case, the support member 9 may also be provided with a portion corresponding to the embedded portion 4b that exhibits the anchor effect in the filling material 5, like the lid member 4.

However, for example, in a case of a configuration in which an external force is not applied to the filling material 5 from the lower opening by another member in an assembled state as an ASSY (Assembly), the support member 9 does not necessarily need to be provided. In this case, the support member 9 may be formed of, for example, a tape material so that the support member 9 is used only during a period in which the potting material is filled, and it is peeled off after the potting material is cured and the filling material 5 is formed.

In addition, in the wiring component for electrical equipment 1 of the present application, the hollow portion 3v that is opened upward and downward is formed at the stage of the integrally molded product. This makes it possible to perform integral molding using only an upper and lower mold without using a slide mold, and thus there is an advantage in that the mold cost is reduced.

Embodiment 2

Figure 5:
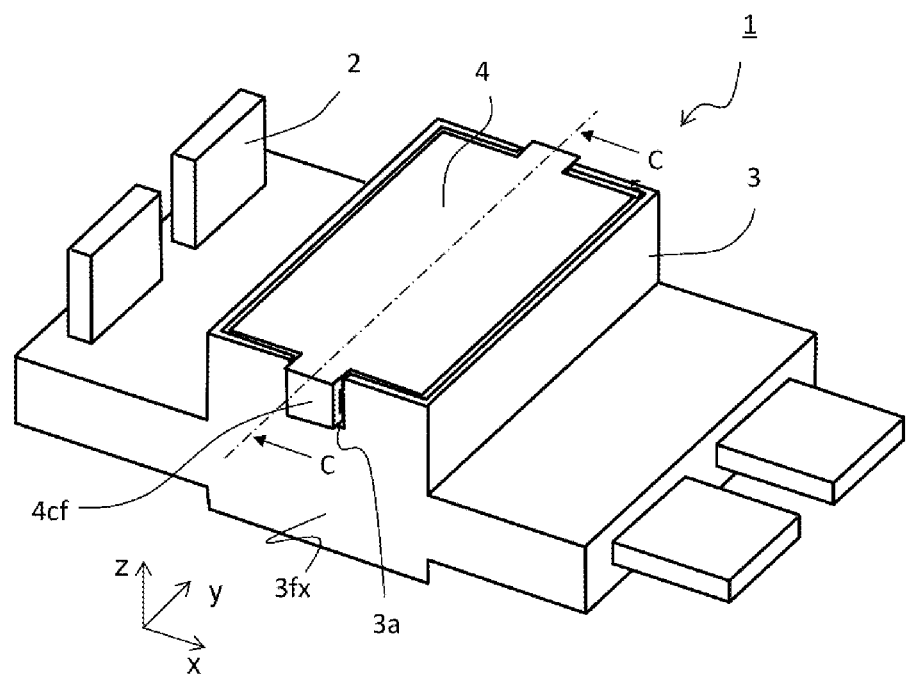
FIG. 5 is a perspective view of a wiring component for electrical equipment according to Embodiment 2.
Figure 6:
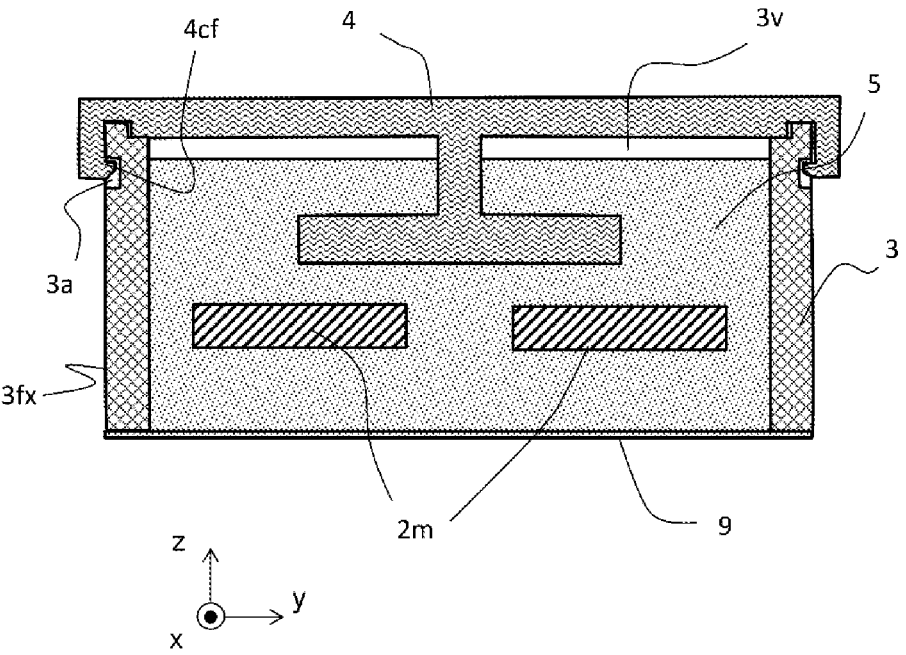
FIG. 6 is a cross-sectional view of the wiring component for electrical equipment according to Embodiment 2.

In Embodiment 2, a description will be given for a configuration that is more excellent in preventing the lid member from detaching in a state before the potting material is cured as the filling material than the case exemplified in Embodiment 1. FIG. 5 and FIG. 6 are diagrams for describing a configuration of a wiring component for electrical equipment according to Embodiment 2, FIG. 5 is a perspective view of the wiring component for electrical equipment when viewed from above, and FIG. 6 is a cross-sectional view corresponding to a line C-C in FIG. 5.

Note that, in the wiring component for electrical equipment according to Embodiment 2, the same configuration as that of Embodiment 1 can be applied to the configuration other than the prevention of the detachment of the lid member, the description of the same portion will be omitted, and FIG. 4B used in Embodiment 1 will be referred to.

In the wiring component for electrical equipment 1 according to Embodiment 2, as shown in FIG. 5 and FIG. 6, snap fit protrusions 4cf are provided at intermediate portions between two opposing sides of the lid portion 4c, and recessed portions 3a to be engaged with the snap fit protrusions 4cf are provided at upper portions of an outer side surface 3fx surrounding the hollow portion 3v of the housing 3. In other words, the snap fit protrusions 4cf and the recessed portions 3a function as a snap fit mechanism for forming a snap fit coupling that regulates the movement of the lid member 4 in the direction in which the lid member 4 is detached from the housing 3. The assembling order is the same as that of Embodiment 1. After the bus bars 2 are insert-molded using the resin constituting the housing 3, the support member 9 is attached to the housing 3, and the lid member 4 is attached before the potting material is cured.

After the potting material is cured and the filling material 5 is formed, the embedded portion 4b exhibits the anchor effect and the lid member 4 can be prevented from detaching. The present embodiment is different from Embodiment 1 in that, during a period in which the anchor effect is not exhibited, the temporary fixing is performed by using the snap fit coupling between the snap fit protrusions 4cf and the recessed portions 3a, so that the fixing force to the housing 3 is larger than that in the case of the temporary fixing by the ribs 4cp. For example, this structure is useful when firm temporary fixing is required before the potting material is cured in consideration of the attachment environment of the lid member 4.

Embodiment 3

Figure 7:
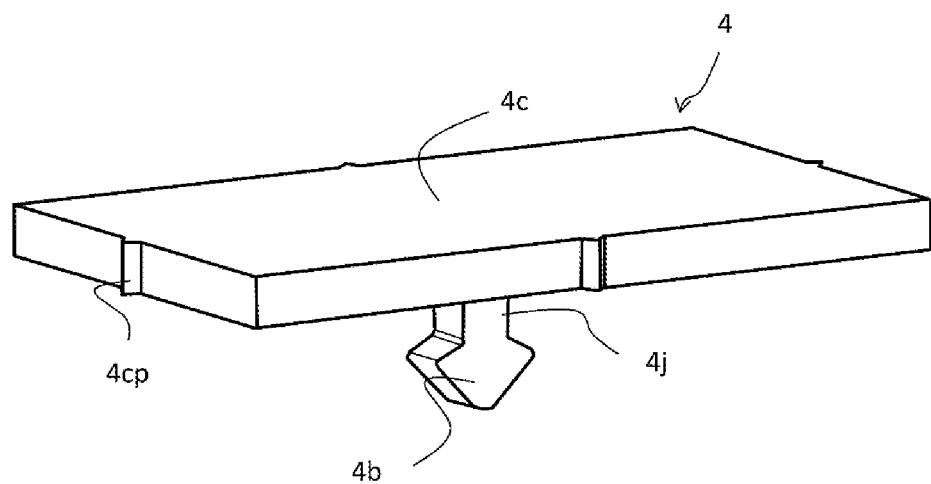
FIG. 7 is a perspective view of a lid member of a wiring component for electrical equipment according to Embodiment 3.
Figure 8:
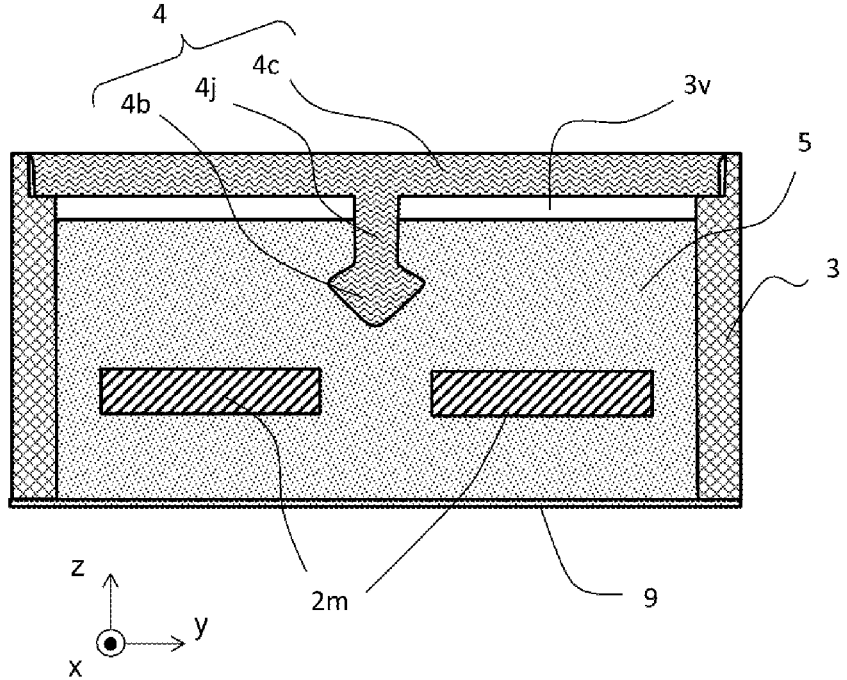
FIG. 8 is a cross-sectional view of the wiring component for electrical equipment according to Embodiment 3.

In Embodiment 3, a shape of the embedded portion of the lid member is devised in contrast to the wiring component for electrical equipment according to Embodiment 1 or Embodiment 2. FIG. 7 and FIG. 8 are diagrams for describing a configuration of a wiring component for electrical equipment in Embodiment 3. FIG. 7 is a perspective view of a lid member as viewed from above, and FIG. 8 is a cross-sectional view corresponding to FIG. 4A.

In the wiring component for electrical equipment according to Embodiment 3, the same configuration as that of Embodiment 1 or Embodiment 2 can be applied to the configuration other than the shape of the embedded portion, and the description of the same portion will be omitted, and FIG. 1A, FIG. 1B, FIG. 2, and FIG. 3 used in Embodiment 1 will be referred to.

In the wiring component for electrical equipment 1 according to Embodiment 3, as shown in FIG. 7 and FIG. 8, the cross-sectional shape of the embedded portion 4b of the lid member 4 is a shape close to a rhombus: that is, it is inclined with respect to the direction of insertion toward the filling material 5. To be more specific, the embedded portion 4b is provided with an inclined surface formed such that, toward the distal end away from the lid portion 4c, an area in the direction perpendicular to the extending direction from the lid portion 4c is widened, and an inclined surface formed such that an area toward the distal end is narrowed from the area that is fully widened.

Even in this case, the assembling order is the same as that of Embodiment 1. After the bus bars 2 are insert-molded using the resin constituting the housing 3, the support member 9 is attached to the housing 3, and the lid member 4 is attached before the filling material 5 (potting material)

is cured. When the embedded portion 4*b* enters the filling material 5, the filling material 5 easily goes around along the inclination of the embedded portion 4*b*, so that the possibility of air being caught in the filling material 5 is reduced. For example, in the case of having a surface perpendicular to the inserting direction as shown in FIG. 4A, when the embedded portion 4*b* enters the filling material 5, air enters before the filling material 5 goes around the embedded portion 4*b*, and when the potting material is cured, air bubbles are connected inside, which may cause a leak path.

In particular, in a structure in which the filling amount of the filling material 5 is small, in a case where air bubbles enter the inside of the filling material 5 when the lid member 4 is attached, the ratio of the air bubbles to the filling amount of the filling material 5 increases, and thus the possibility that a leak path is probabilistically generated increases. Therefore, this increases the advantage of the present configuration. In addition, in the assembly process of the lid member 4, when it is desired to shorten the attachment time of the lid member 4 as much as possible, it is necessary to increase the attachment speed of the lid member 4. In the case of an assembly process in which the attachment speed is high, since air bubbles are likely to be mixed before the filling material 5 goes around the embedded portion 4*b*, the structure in which the embedded portion 4*b* is inclined with respect to the inserting direction is effective. In particular, by making the cross-sectional shape rhombic, the embedded portion 4*b* has the inclined surface such that the area is narrowed from the fully widened portion toward the lid portion 4*c*, which further prevents the filler material 5 that has gone around the buried portion 4*b* from peeling off.

After the potting material is cured to form the filling material 5, the embedded portion 4*b* exhibits the anchor effect to the filling material 5 to prevent the lid member 4 from detaching.

Embodiment 4

Figure 9:
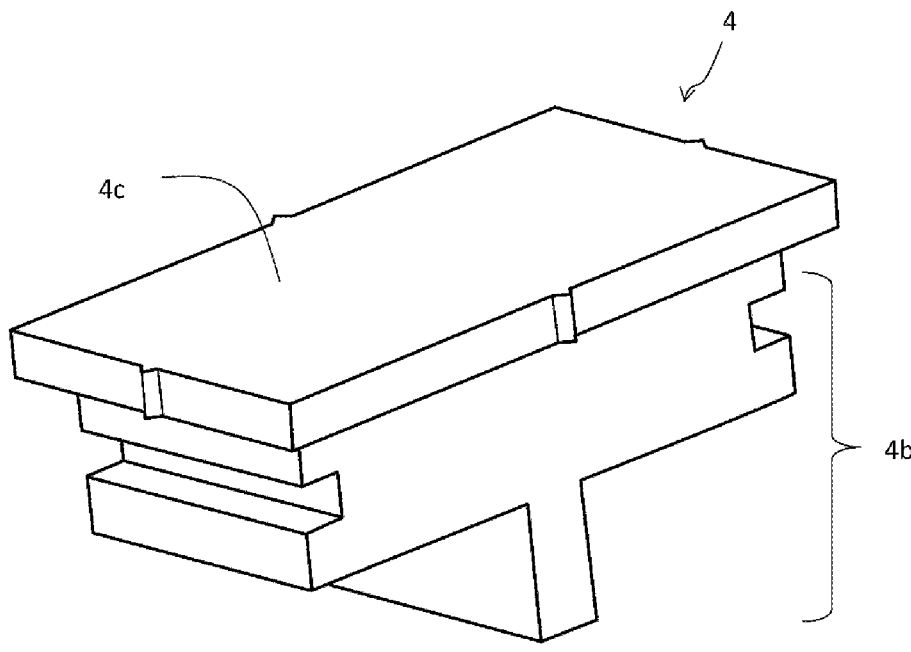
FIG. 9 is a perspective view of a lid member of a wiring component for electrical equipment according to Embodiment 4.
Figure 10:
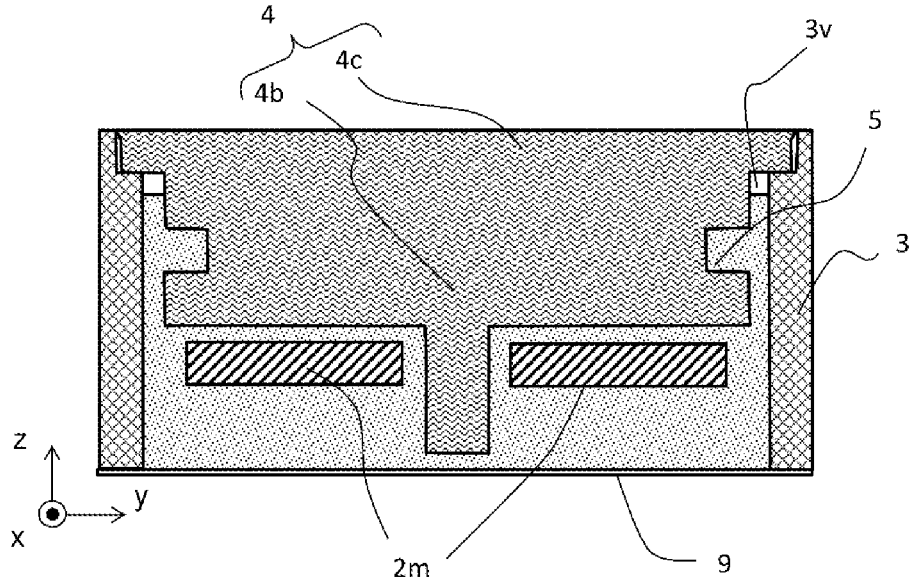
FIG. 10 is a cross-sectional view of the wiring component for electrical equipment according to Embodiment 4.

In Embodiment 4, a volume of the embedded portion of the lid member is increased in order to reduce the amount of the filling material used in contrast to the wiring component for electrical equipment according to Embodiments 1 to 3. FIG. 9 and FIG. 10 are diagrams for describing a configuration of a wiring component for electrical equipment according to Embodiment 4, FIG. 9 is a perspective view of a lid member as viewed from above, and FIG. 10 is a cross-sectional view corresponding to FIG. 4A.

Note that, in the wiring component for electrical equipment according to Embodiment 4, the same configuration as those of Embodiment 1 to Embodiment 3 can be applied to the configuration other than the shape of the embedded portion, the description of the same portions will be omitted, and FIG. 1A, FIG. 1B, FIG. 2, and FIG. 3 used in Embodiment 1 will be referred to.

In the wiring component for electrical equipment 1 according to Embodiment 4, as shown in FIG. 9 and FIG. 10, the volume of the embedded portion 4*b* of the lid member 4 is made larger than those of the embedded portions 4*b* of Embodiment 1 to Embodiment 3, and the columnar portion 4*j* is not distinguished from the embedded portions 4*b*. The assembling order is the same as that of Embodiment 1. After the bus bars 2 are insert-molded using the resin constituting the housing 3, the support member 9 is attached to the housing 3, and the lid member 4 is attached before the potting material is cured.

In Embodiment 4, a structure is provided in which the volume of the portion of the lid member 4 inserted into the filling material 5 (the embedded portion 4*b* including the portion corresponding to the columnar portion 4*j* in Embodiment 1) is increased. In this case, although the filling amount of the filling material 5 is reduced, the filling amount can be reduced as long as the amount of the filling material 5 is sufficient to satisfy the waterproof function as the purpose of filling the filling material 5 and the insulation performance between the bus bars with different voltages. Therefore, the filling amount of the filling material 5 can be reduced by increasing the size of the embedded portion 4*b* until the filling amount reaches the above-described amount. In general, the material cost of the potting material constituting the filling material 5 is higher than that of the resin material constituting the housing 3 and the like. Therefore, according to the present configuration, the material cost is lower than those of Embodiment 1 to Embodiment 3.

Embodiment 5

Figure 11:
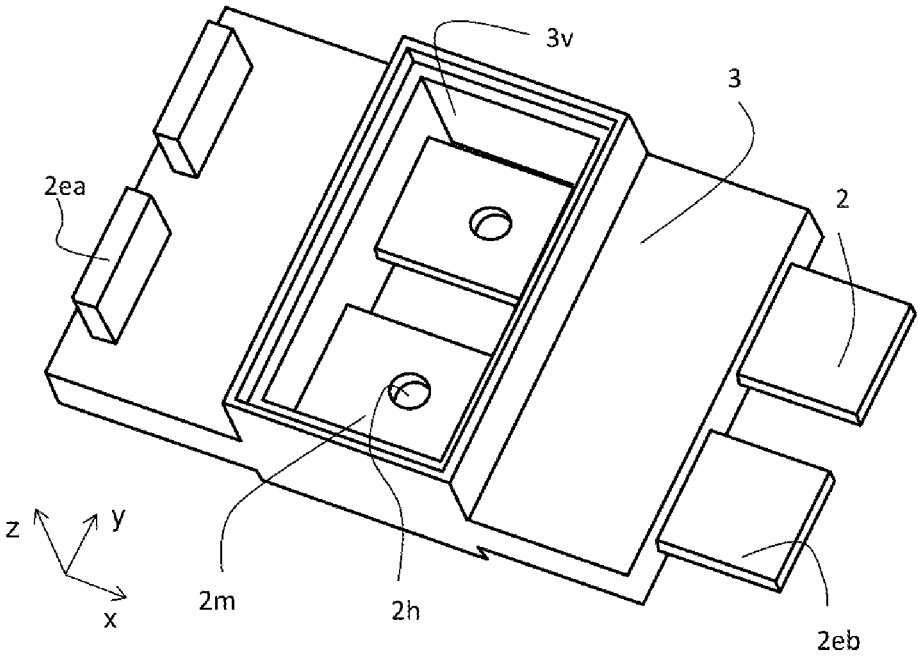
FIG. 11 is a perspective view of an integrally molded product of bus bars and a housing in a wiring component for electrical equipment according to Embodiment 5.

In Embodiment 5, a through hole is provided in an intermediate portion of a bus bar so that the through hole makes it easier for the filling material to go around. FIG. 11 is a perspective view of an integrally molded product of bus bars and the housing as viewed from above for describing a configuration of a wiring component for electrical equipment according to Embodiment 5.

In the wiring component for electrical equipment according to Embodiment 5, the same configuration as those of Embodiment 1 to Embodiment 4 can be applied to the configuration other than the shape of the bus bars, the description of the same portions will be omitted, and FIG. 4A and FIG. 4B used in Embodiment 1 will be referred to for the relationship between the embedded portion and the filling material.

In the wiring component for electrical equipment 1 according to Embodiment 5, as shown in FIG. 11, the through hole 2*h* penetrating in the vertical direction (z) is provided on a surface of the bus bar 2 facing the opening in the intermediate portion 2*m* that is to be covered with the filling material 5. The assembling order is the same as that of Embodiment 1. That is, after the bus bars 2 are insert-molded using the resin constituting the housing 3, the support member 9 is attached to the housing 3, and the lid member 4 is attached before the potting material is cured.

Since it is desired to fill the space 3*v* with the filling material 5 without inclusion of air bubbles, it takes a sufficient time to fill the space 3*v* with the filling material 5. However, it is difficult to completely eliminate the air bubbles generated inside the filling material 5 only by injecting the potting material in the atmosphere. Therefore, in Embodiment 5, the through hole 2*h* penetrating the bus bar 2 in the vertical direction is formed in the intermediate portion 2*m* of the bus bar 2 exposed in the hollow portion 3*v*.

When the potting material is injected to the integrally molded product in which the support member 9 is attached to the bottom of the hollow portion 3*v*, the potting material is gradually filled from the bottom of the hollow portion 3*v*, and the air bubbles to be accumulated on the lower surface of the bus bar 2 can be released from the through hole 2*h*. Therefore, a structure is obtained in which the air bubbles are less likely to be accumulated inside the filling material 5 formed by curing the potting material. Further, the through hole 2*h* can be used for positioning the bus bar 2 at the time of insert molding, and the through hole 2*h* of the bus bar 2 is not exposed to the outside after the potting material is filled.

When the bus bars are insert-molded using the resin constituting the housing, positioning of the bus bars are important. When a pin of a mold is kept inserted into the through hole during molding, the portion of the bus bar where the through hole is formed is exposed to the outside after the molding. When used in such a state, a conductive substance such as salt is deposited on the wiring component for electrical equipment, which may cause a short circuit within the wiring component for electrical equipment. Therefore, a step of filling the exposed portion with an adhesive is required in some cases. However, in the structure of the wiring component for electrical equipment 1 according to Embodiment 5, since the portion exposed from the housing 3 in which the through hole 2h is formed is to be covered with the filling material 5, the through hole 2h used for positioning the bus bar 2 is not exposed. Therefore, there is an advantage in that an additional adhesive application process is not required.

Embodiment 6

Figure 12:
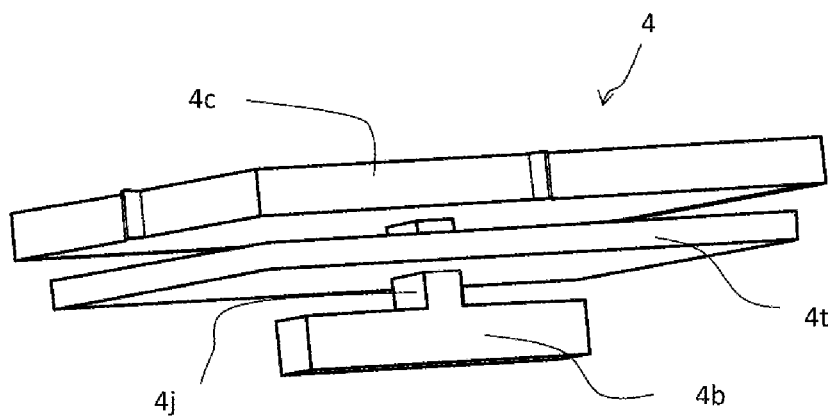
FIG. 12 is a perspective view of a lid member of a wiring component for electrical equipment according to Embodiment 6.
Figure 13:
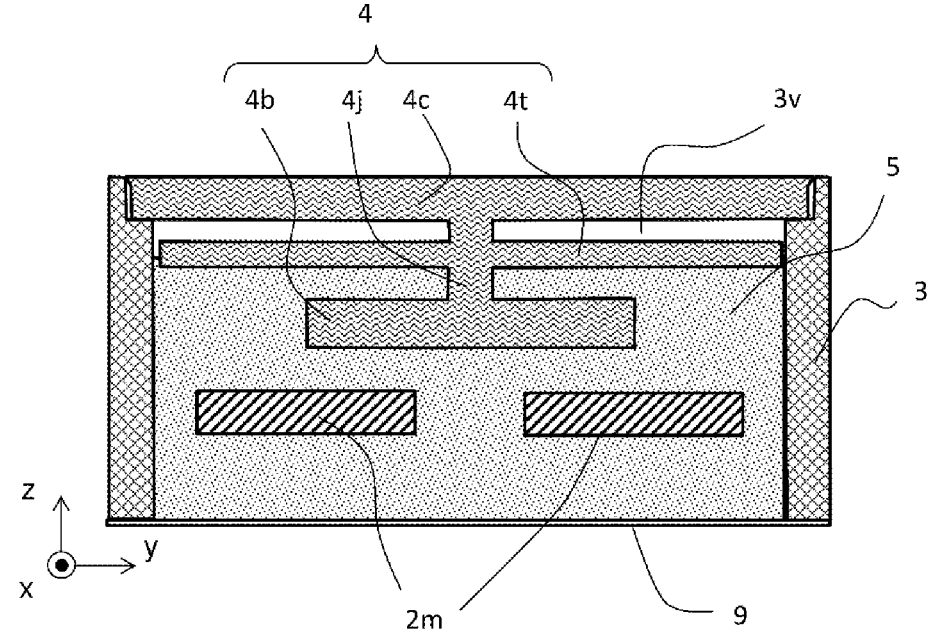
FIG. 13 is a cross-sectional view of the wiring component for electrical equipment according to Embodiment 6.

In Embodiment 6, a cover plate that covers the upper surface of the filling material is provided on the lid member in order to reduce the exposed area of the filling material in contrast to the wiring component for electrical equipment according to Embodiment 1 to Embodiment 5. FIG. 12 and FIG. 13 are diagrams for describing a configuration of a wiring component for electrical equipment according to Embodiment 6, FIG. 12 is a perspective view of a lid member as viewed from the lower side, and FIG. 13 is a cross-sectional view corresponding to FIG. 4A.

In the wiring component for electrical equipment according to Embodiment 6, the same configuration as those of Embodiment 1 to Embodiment 5 can be applied to the configuration other than the cover plate of the lid member, the description of the same portions will be omitted, and FIG. 1A, FIG. 1B, FIG. 2, and FIG. 3 used in Embodiment 1 will be referred to.

In the wiring component for electrical equipment 1 according to Embodiment 6, as shown in FIG. 12 and FIG. 13, a cover plate 4t that covers an upper surface of the filling material 5 is provided in an intermediate portion in the columnar portion 4j of the lid member 4 between the embedded portion 4b and the lid portion 4c. With this structure, even when a harmful substance that adversely affects the filling material 5 enters through a gap between the lid member 4 and the upper opening of the hollow portion 3v, the upper surface of the filling material 5 is covered with the cover plate 4t, thereby reducing the area to be contact with a harmful substance in the upper surface. In addition, by making the outer shape of the cover plate 4t in the x-y plane fit with the inner peripheral surface of the hollow portion 3v, the entire upper surface of the filling material 5 can be covered with the cover plate 4t.

Embodiment 7

Figure 14:
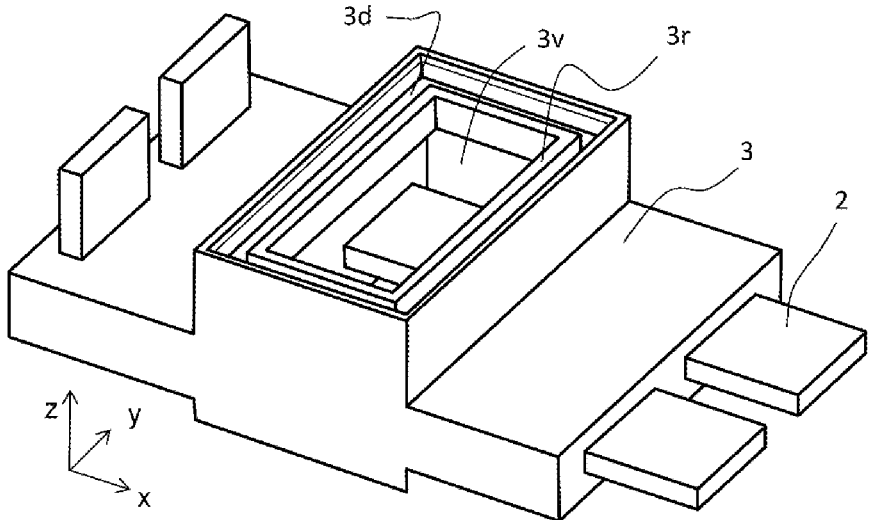
FIG. 14 is a perspective view of an integrally molded product of bus bars and a housing in a wiring component for electrical equipment according to Embodiment 7.
Figure 15:
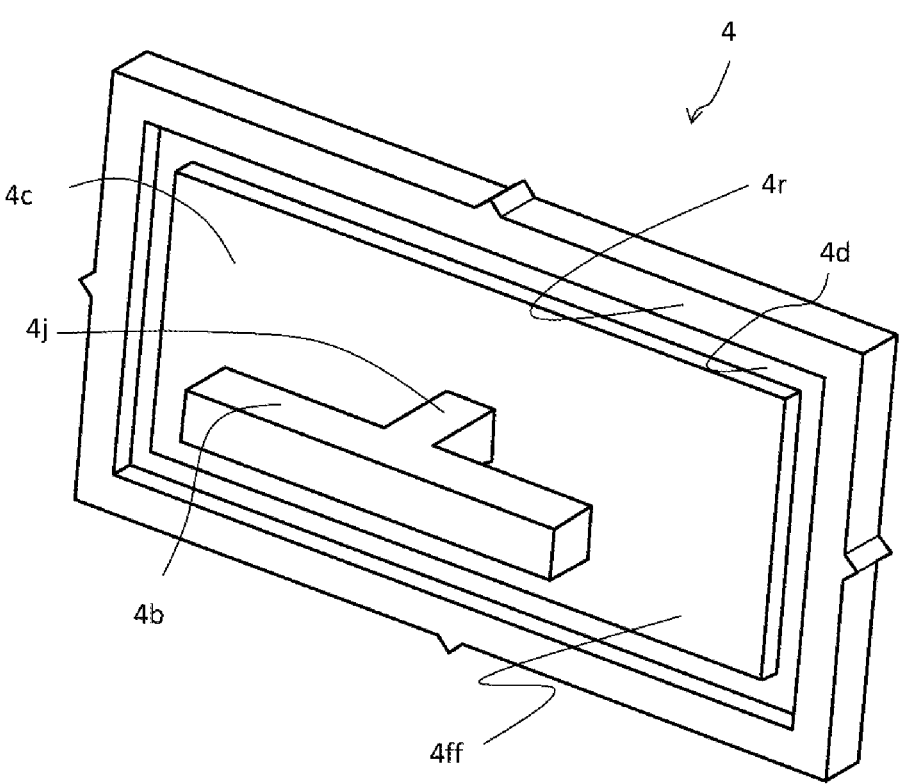
FIG. 15 is a perspective view of a lid member of the wiring component for electrical equipment according to Embodiment 7.
Figure 16:
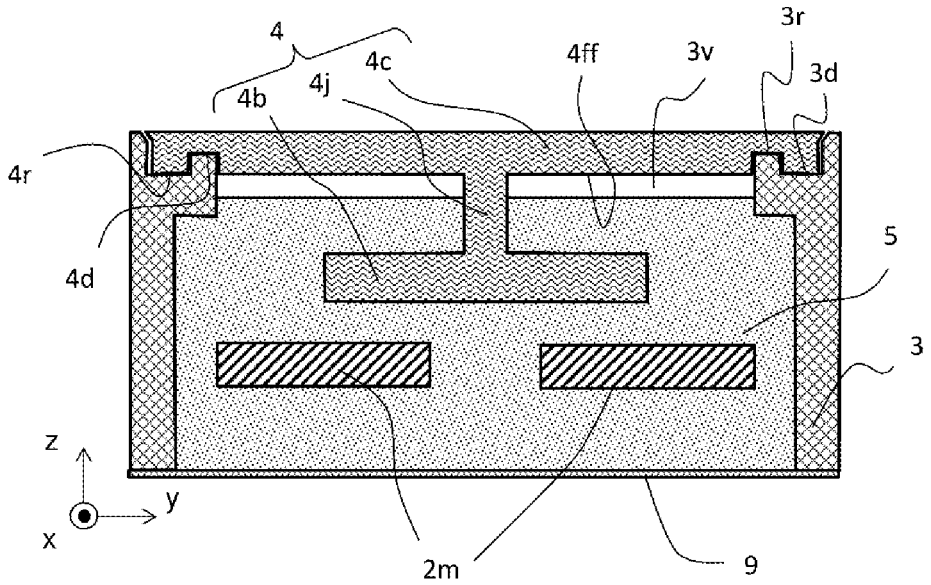
FIG. 16 is a cross-sectional view of the wiring component for electrical equipment according to Embodiment 7.

In Embodiment 7, a configuration in which a labyrinth structure is formed between the lid member and the housing in order to strengthen the isolation between the filling material and the outside will be described. FIG. 14 to FIG. 16 are diagrams for describing a configuration of a wiring component for electrical equipment according to Embodiment 7, FIG. 14 is a perspective view of an integrally molded product of bus bars and a housing as viewed from above, FIG. 15 is a perspective view of a lid member as viewed from below, and FIG. 16 is a cross-sectional view corresponding to FIG. 4A.

Note that, in the wiring component for electrical equipment according to Embodiment 7, the same configuration as those of Embodiment 1 to Embodiment 6 can be applied to the configuration other than the labyrinthine structure between the lid member and the housing, the description of the same portions will be omitted, and FIG. 1A, FIG. 1B, FIG. 2, and FIG. 3 used in Embodiment 1 will be referred to.

In the wiring component for electrical equipment 1 according to Embodiment 7, as shown in FIG. 14, a groove portion 3d recessed in the z direction is formed over the entire periphery of the inner edge portion of the upper opening of the hollow portion 3v in the housing 3, and a ridge portion 3r protruding in the z direction is formed over the entire periphery in the inner side of the groove portion 3d in the x-y plane. In accordance with this, in the lid member 4, as shown in FIG. 15, a ridge portion 4r corresponding to the groove portion 3d is provided at the outer edge portion of a surface 4ff of the lid portion 4c opposed to the hollow portion 3v over the entire periphery, and a groove portion 4d corresponding to the ridge portion 3r is formed inside the ridge portion 4r over the entire periphery.

Accordingly, when the lid member 4 is put on the housing 3, as shown in FIG. 16, the ridge portion 3r is fitted into the groove portion 4d, and the ridge portion 4r is fitted into the groove portion 3d, thereby forming a labyrinth seal structure and isolating the hollow portion 3v from the outside. That is, the groove portion 4d, the ridge portion 3r, the groove portion 3d, and the ridge portion 4r are combined to function as a labyrinthine seal mechanism. By forming the labyrinth seal structure, when the wiring component for electrical equipment 1 is installed outside, it is possible to prevent liquid such as salt water or water from entering from a gap between the lid member 4 and the housing 3.

Embodiment 8

Figure 17:
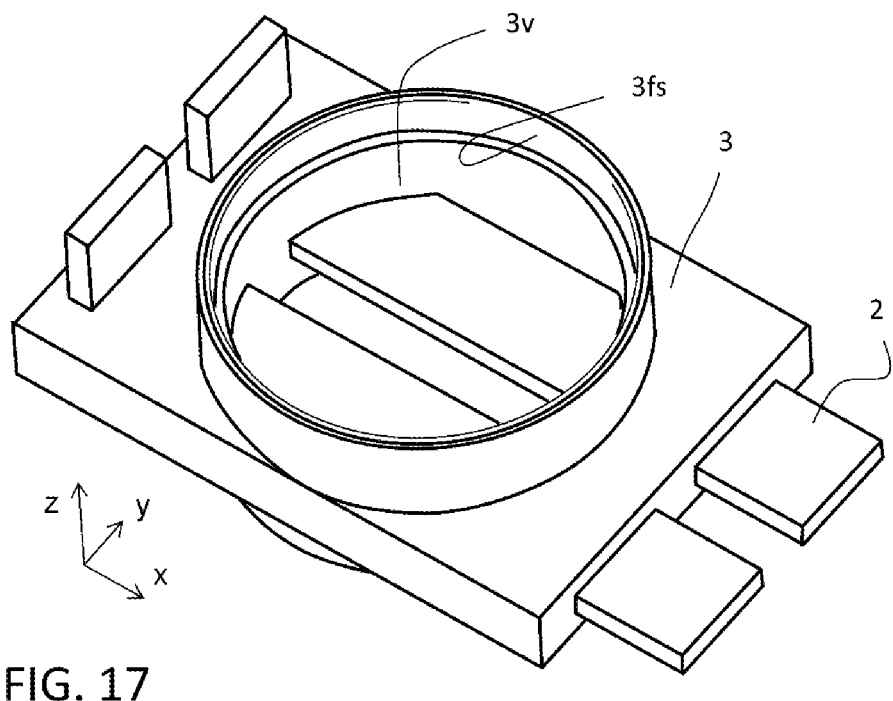
FIG. 17 is a perspective view of an integrally molded product of bus bars and a housing in a wiring component for electrical equipment according to Embodiment 8.
Figure 18:
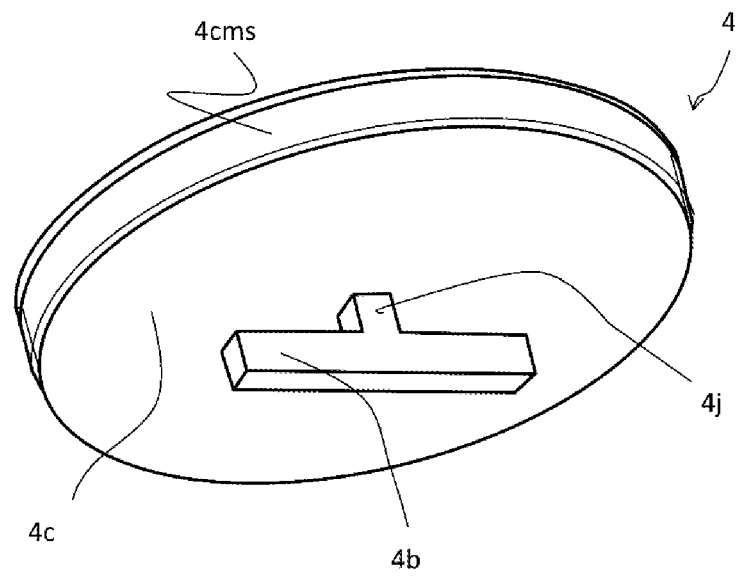
FIG. 18 is a perspective view of a lid member of the wiring component for electrical equipment according to Embodiment 8.

In Embodiment 8, a configuration in which the lid member and the housing are fixed by a thread structure will be described. FIG. 17 and FIG. 18 are diagrams for describing a configuration of a wiring component for electrical equipment according to Embodiment 8, FIG. 17 is a perspective view of an integrally molded product of bus bars and a housing as viewed from above, and FIG. 18 is a perspective view of a lid member as viewed from below.

In the wiring component for electrical equipment according to Embodiment 8, the same configuration as those of Embodiment 1, Embodiment 3 to Embodiment 7 can be applied to the configuration other than the structure for fixing the lid member and the housing to each other, the description of the same portions will be omitted, and FIG. 4A and FIG. 4B used in Embodiment 1 will be referred to for the relationship between the bus bars, the embedded portion, and the filling material.

In the wiring component for electrical equipment 1 according to Embodiment 8, as shown in FIG. 17, at least the opening of the hollow portion 3v of the housing 3 is formed in a cylindrical shape having a circular shape in the x-y plane, and a female thread 3fs is formed on the inner peripheral surface of the upper opening. In accordance with this, in the lid member 4 as shown in FIG. 18, the lid portion 4c is made circular in shape, and a male thread 4cms corresponding to the female thread 3fs is formed on the outer peripheral surface.

As a result, when the lid member 4 is put on the housing 3, the lid member 4 is inserted while being rotated along the thread and fixed by the thread structure, and the fixing force is larger than that in the case where the lid member 4 is temporarily fixed simply by the (crushed) ribs 4cp. In addition, the attachment state of the lid member 4 can be easily visually recognized as compared with the temporary fixation using the ribs 4cp. For example, when the direction of the load applied to the lid member 4 in the temporary fixation using the ribs 4cp is inclined from the vertical direction (z direction), there may be a case where the lid member 4 is attached with a rib 4cp not crushed exists and an expected fixing force is not exerted.

Even in such a case, the lid member 4 is positioned at a specified height with respect to the housing 3, and there is a possibility that it is erroneously recognized that the lid member 4 has been attached. In contrast, as the fixation method, the attachment method of the lid member 4 having the thread structure is easy, and the above concern can be eliminated. In addition, in the case of the thread structure, the lid member 4 can be detached, and even when the attachment of the lid member 4 fails, the lid member 4 can be repeatedly attached and detached before the potting material is cured.

Embodiment 9

Figure 19:
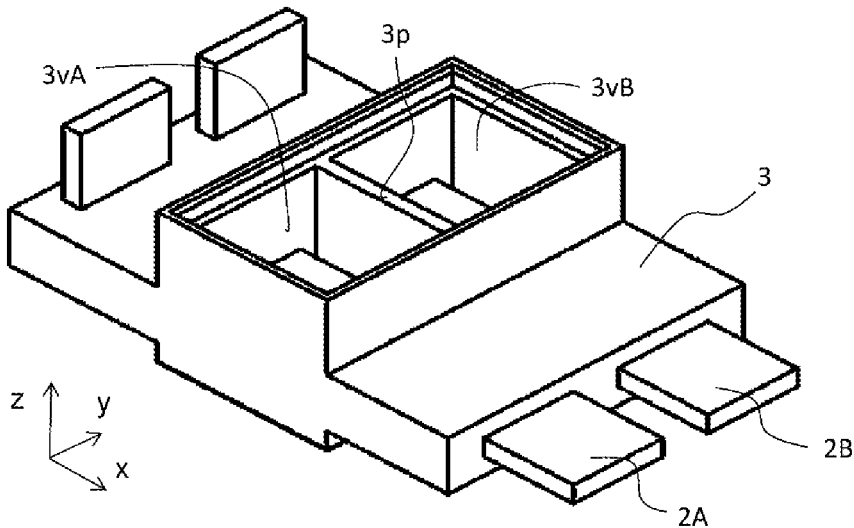
FIG. 19 is a perspective view of an integrally molded product of bus bars and a housing in a wiring component for electrical equipment according to Embodiment 9.
Figure 20:
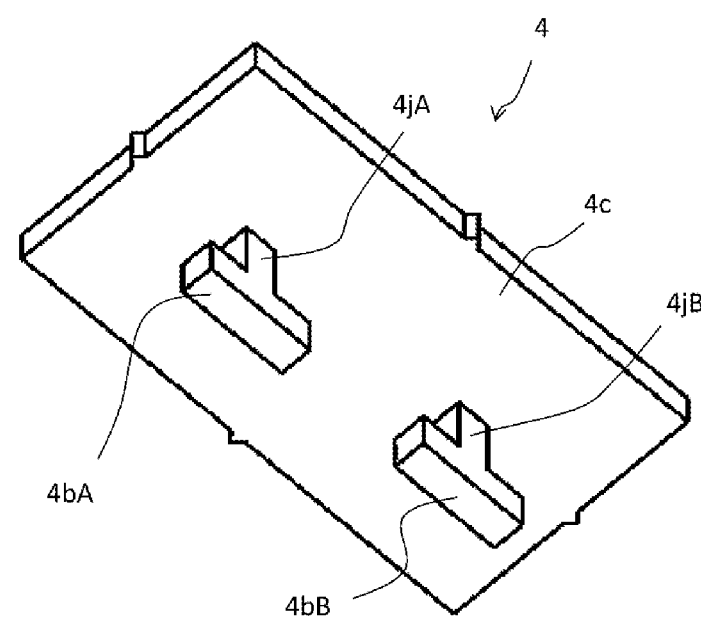
FIG. 20 is a perspective view of a lid member of the wiring component for electrical equipment according to Embodiment 9.
Figure 21:
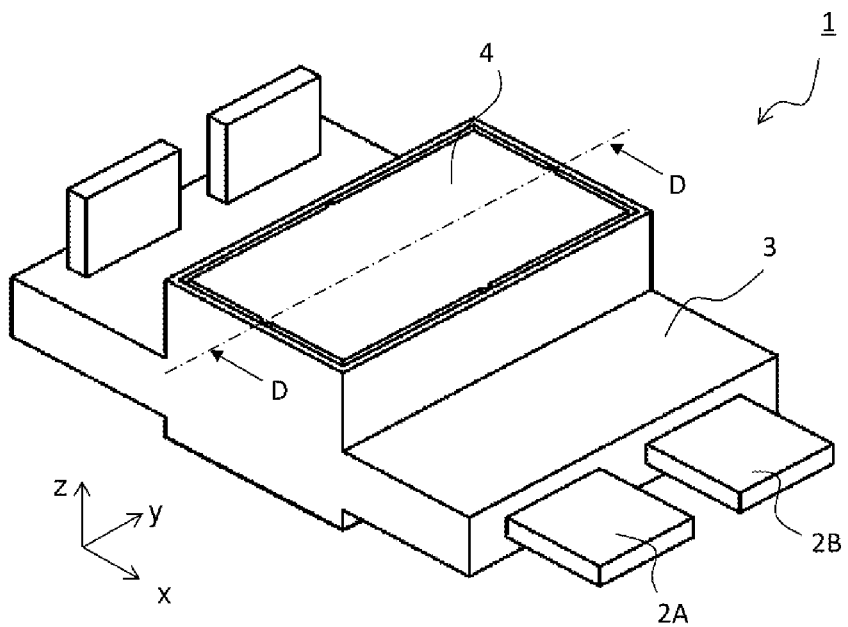
FIG. 21 is a perspective view of the wiring component for electrical equipment according to Embodiment 9.
Figure 22:
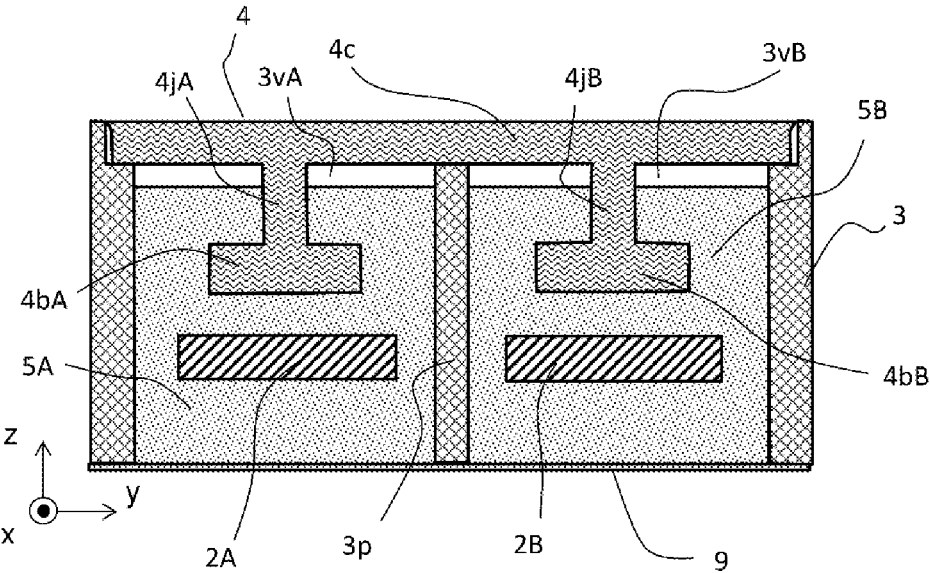
FIG. 22 is a cross-sectional view of the wiring component for electrical equipment according to Embodiment 9.

In each of the above-described embodiments, an example in which the hollow portion for collectively exposing the intermediate portions of a plurality of the bus bars is provided has been described. In Embodiment 9, a description will be given for an example in which a plurality of hollow portions partitioned by a partition wall are provided in order to expose individual intermediate portions of the bus bars. FIG. 19 to FIG. 22 are diagrams for describing a configuration of a wiring component for electrical equipment according to Embodiment 9, FIG. 19 is a perspective view of an integrally molded product of the bus bars and a housing as viewed from above, FIG. 20 is a perspective view of a lid member as viewed from below, and FIG. 21 is a perspective view of the wiring component for electrical equipment as viewed from above. FIG. 22 is a cross-sectional view taken along a line D-D of FIG. 21.

Note that, in the wiring component for electrical equipment according to Embodiment 9, the same configuration as those of Embodiment 1 to Embodiment 8 can be applied to the configuration other than the configuration in which the hollow portion is individually provided corresponding to each bus bar, and the description of the same portion will be omitted.

In the wiring component for electrical equipment 1 according to Embodiment 9, as shown in FIG. 19, the intermediate portions 2m of the bus bars 2A and 2B are partitioned by a partition wall 3p, and hollow portions 3vA and 3vB are provided to expose individually the bus bars 2A and 2B, respectively. Then, as shown in FIG. 20, the lid member 4 is provided with columnar portions 4jA and 4jB that extend to the hollow portions 3vA and 3vB, respectively and in which the embedded portions 4bA and 4bB are formed at the respective distal ends, in the lid portion 4c that collectively closes the two hollow portions 3vA and 3vB.

The assembling order is the same as that in each of the above-described embodiments, and after the bus bars 2 are insert-molded using the resin constituting the housing 3, the support member 9 is attached to the housing 3. However, the potting material serving as the filling material 5 (filling materials 5A and 5B) is separately potted in each of the hollow portions 3vA and 3vB. After the potting material is injected into each of the hollow portions 3vA and 3vB, the lid member 4 is attached before the potting material is cured as the filling material 5.

When the potting material is cured to form the filling material 5, as shown in FIG. 21 and FIG. 22, each of the embedded portions 4bA and 4bB exhibits the anchor effect in the attachment/detachment direction (z direction) of the lid member 4, and has a structure capable of preventing the lid member 4 from detaching. In addition, since the air clearance and creepage distance between the bus bars 2A and 2B can be secured in advance by the partition wall 3p, even if the filling state of the filling material 5 varies, the insulation between the bus bars 2A and 2B can be reliably secured.

Note that, in the present example, an example in which the embedded portion 4b is provided for each of the plurality of hollow portions 3v has been described, but this is not a limitation. For example, it may be provided for either of the hollow portions 3v with respect to one lid portion 4c. Further, an example in which the plurality of hollow portions 3v are collectively closed has been described, but this is not a limitation, and the lid member 4 may be provided for each of the hollow portions 3v.

Although various exemplary embodiments and examples are described in the present application, various features, aspects, and functions described in one or more embodiments are not inherent in an application of the contents disclosed in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component disclosed in another embodiment are included.

For example, an example in which PPS is used for the housing 3, copper is used for the bus bars 2, and silicone rubber is used for the filling material 5 has been described, but this is not a limitation. For example, as the filling material 5, another thermosetting elastomer or thermoplastic elastomer may be used as long as it satisfies adhesion and followability, and any so-called elastic polymer material is applicable.

In this example, the entire intermediate portion 2m arranged in the hollow portion 3v is covered with the filling material 5 that is continuous to the boundary portion with the housing 3. However, this is not necessarily a limitation from the viewpoint of preventing water from entering through a gap formed between the end portion 2ea and the end portion 2eb. In order to block only the leak path between the bus bar 2A and the bus bar 2B in the hollow portion 3v, for example, as in Embodiment 9, it is sufficient to form the partition wall 3p extending in the x-z plane direction in the housing 3 and partitioning the space between the bus bar 2A and the bus bar 2B in the hollow portion 3v. In this case, it is not necessary to cover the further intermediate portion of the intermediate portion 2m with the filling material 5, and if the boundary portion between the intermediate portion 2m and the housing 3 is covered over the entire periphery, it is possible to achieve both the blocking of the leak path and the prevention of the entry of water through the gaps between the housing 3 and the bus bars 2.

Further, the material constituting the housing 3 is not limited to the thermoplastic resin, and a thermosetting resin may be used as long as it is a material in which the bus bars 2 are embedded and which has rigidity as the housing.

Further, an example in which the hollow portion $3v$ is opened to the upper and lower sides so that molding can be performed only by the upper and lower molds has been described, but this not a limitation, and only one side may be opened as long as the filling material $5$ can be filled. Furthermore, in addition to aluminum, any conductor having excellent conductivity can be applied to the bus bars $2$, and the number of bus bars $2$ is not limited to two.

As described above, the wiring component for electrical equipment $1$ according to the present application is configured to include, a plurality of bus bars $2$, a housing $3$ made of resin in which the plurality of bus bars $2$ are each exposed at both ends (end portion $2ea$, end portion $2eb$) and embedded inside at an interval to each other, and a hollow portion $3v$ is provided in which an opening through which an intermediate portion $2m$ of each of the plurality of bus bars $2$ is exposed is formed, a filling material $5$ made of an elastomer filled in the hollow portion $3v$ and covering an entire periphery of the bus bars $2$ at least at a boundary portion between the intermediate portions $2m$ and the housing $3$, and a lid member $4$ including a lid portion $4c$ that closes the opening and an embedded portion $4b$ that extends from the lid portion $4c$ toward the filling material $5$ and is embedded in the filling material $5$. As a result, it is possible to prevent a leakage current caused by the gap between the bus bars $2$ and the resin constituting the housing $3$, and thus it is possible to obtain the wiring component for electrical equipment $1$ with high reliability. At this time, since the opening is closed by the lid portion $4c$, it is possible to protect the filling material $5$, which is excellent in adhesion between the bus bars $2$ and the housing $3$ and followability with respect to displacements but is inferior in rigidity, from an external force and to maintain the adhesion.

When the hollow portion $3v$ is configured to have a second opening on the opposite side of the opening to be closed by the lid portion $4c$, molding by upper and lower molds without using a slide mold becomes possible.

Since the housing $3$ is an integrally molded product with the plurality of bus bars $2$, the housing $3$ can be easily manufactured, and in particular, when the housing $3$ has the second opening, the housing $3$ can be more easily manufactured only by upper and lower molds.

When the embedded portion $4b$ is configured to have the portion whose area in a direction (x-y direction) perpendicular to a direction (z direction) in which the embedded portion extends from the lid portion $4c$ is widened toward a distal end of the embedded portion away from the lid portion $4c$, it is possible to prevent the lid member from detaching by the anchor effect after the filling material $5$ is cured.

At this time, when the embedded portion $4b$ is configured such that, from the portion where the area is widened toward the distal end, an inclined surface is formed so as to narrow the area as the distance from the lid portion $4c$ increases, it is possible to suppress inclusion of air bubbles into the filling material $5$ when the lid member $4$ is attached. Further, when an inclined surface is formed so as to narrow the area from the fully widened area of the portion toward the lid portion $4c$, it is possible to further suppress the separation of the filling material $5$ having gone around the embedded portion $4b$.

When the through hole $2h$ is formed on the surface of the intermediate portion $2m$ facing the opening, the air bubbles can be allowed to escape as the filling of the filling material $5$ progresses.

When the filling material $5$ is configured to cover the entire periphery over the entire length of the intermediate portions $2m$, even if the plurality of bus bars $2$ are arranged without a partition wall in the hollow portion $3v$, the leakage current between the bus bars $2$ can be reliably prevented.

When the ridge portion $4r$ protruding in the thickness direction and the groove portion $4d$ recessed in the thickness direction are formed over the entire periphery of the outer edge portion of the surface $4\!f\!f$ of the lid portion $4c$ facing the opening, and a second groove portion (groove portion $3d$) and a second ridge portion (ridge portion $3r$) to be fitted to the ridge portion $4r$ and the groove portion $4d$, respectively, are formed in the inner edge portion of the opening of the housing $3$, the labyrinthine structure can be formed to reliably prevent water from entering through the gap between the lid portion $4c$ and the opening.

If the lid member $4$ and the housing $3$ are provided with the snap fit mechanism for forming the snap fit coupling that regulates movement of the lid member $4$ in the direction of removal from the housing $3$ when the lid portion $4c$ closes the opening, the lid member $4$ can be prevented from detaching from the housing $3$ even before the potting material is cured.

Alternatively, even when the male thread $4cms$ is formed on the outer peripheral surface of the lid portion $4c$ and the female thread $3\!f\!s$ corresponding to the male thread $4cms$ is formed on the inner peripheral surface of the opening of the housing $3$, the lid member $4$ can be prevented from detaching from the housing $3$ even before the potting material is cured.

DESCRIPTION OF REFERENCE NUMERALS AND SIGNS $1$: wiring component for electrical equipment, $2$: bus bar, $2ea$, $2eb$: end portion, $2h$: through hole, $2m$: intermediate portion, $3$: housing, $3a$: recessed portion (snap fit mechanism), $3d$: groove portion (labyrinth mechanism), $3\!f\!s$: female thread, $3p$: partition wall, $3r$: ridge portion (labyrinth mechanism), $3v$: hollow portion, $4$: lid member, $4b$: embedded portion, $4c$: lid portion, $4cf$: snap fit protrusion (snap fit mechanism), $4cms$: male thread, $4cp$: rib, $4d$: groove portion (labyrinth mechanism), $4j$: columnar portion, $4r$: ridge portion (labyrinth mechanism), $4t$: cover plate, $5$: filling material

The invention claimed is:

1. A wiring component for electrical equipment comprising:
   a plurality of bus bars;
   a housing made of resin in which the plurality of bus bars are each exposed at both ends and embedded inside at an interval to each other, and a hollow portion is provided in which an opening through which an intermediate portion of each of the plurality of bus bars is exposed is formed;
   a filling material made of an elastomer that is superior in followability and adhesion but is lower in rigidity than the resin of the housing filled in the hollow portion and covering an entire periphery of the bus bars at least at a boundary portion between the intermediate portions and the housing so as to cut off a gap between the intermediate portion and the housing; and
   a lid member including a lid portion that closes the opening and an embedded portion that extends from the lid portion toward the filling material and is embedded in the filling material,
   wherein the hollow portion is provided with a second opening on an opposite side of the opening to be closed with the lid portion.

2. The wiring component for electrical equipment according to claim 1, wherein the housing is an integrally molded product with the plurality of bus bars.

3. The wiring component for electrical equipment according to claim 2, wherein the embedded portion has a portion whose area in a direction perpendicular to a direction in which the embedded portion extends from the lid portion is widened toward a distal end of the embedded portion away from the lid portion.

4. The wiring component for electrical equipment according to claim 1, wherein the housing is an integrally molded product with the plurality of bus bars.

5. The wiring component for electrical equipment according to claim 4, wherein the embedded portion has a portion whose area in a direction perpendicular to a direction in which the embedded portion extends from the lid portion is widened toward a distal end of the embedded portion away from the lid portion.

6. The wiring component for electrical equipment according to claim 1, wherein the embedded portion has a portion whose area in a direction perpendicular to a direction in which the embedded portion extends from the lid portion is widened toward a distal end of the embedded portion away from the lid portion.

7. The wiring component for electrical equipment according to claim 6, wherein an inclined surface is formed such that, toward the distal end of the embedded portion from the portion where the area is widened, the area is narrowed as a distance from the lid portion increases.

8. The wiring component for electrical equipment according to claim 1, wherein a through hole is provided on a surface in the intermediate portion facing the opening.

9. The wiring component for electrical equipment according to claim 1, wherein the filling material covers an entire periphery of the intermediate portion over an entire length of the intermediate portion.

10. The wiring component for electrical equipment according to claim 1, wherein a ridge portion protruding in a thickness direction and a groove portion recessed in the thickness direction are formed over an entire periphery of an outer edge portion of a surface of the lid portion facing the opening, and a second groove portion and a second ridge portion that are fitted to the ridge portion and the groove portion, respectively, are formed in an inner edge portion of the opening of the housing.

11. The wiring component for electrical equipment according to claim 1, wherein the lid member and the housing are provided with a snap fit mechanism for forming a snap fit coupling that regulates movement of the lid member in the direction of removal from the housing when the lid portion closes the opening.

12. The wiring component for electrical equipment according to claim 1, wherein a male thread is formed on an outer periphery of the lid portion and a female thread corresponding to the male thread is formed on an inner periphery of the opening in the housing.

13. A wiring component for electrical equipment comprising:

a plurality of bus bars;

a housing made of resin in which the plurality of bus bars are each exposed at both ends and embedded inside at an interval to each other, and a hollow portion is provided in which an opening through which an intermediate portion of each of the plurality of bus bars is exposed is formed;

a filling material made of an elastomer filled in the hollow portion and covering an entire periphery of the bus bars at least at a boundary portion between the intermediate portions and the housing; and a lid member including a lid portion that closes the opening and an embedded portion that extends from the lid portion toward the filling material and is embedded in the filling material, wherein a through hole is provided on a surface in the intermediate portion facing the opening.

14. A wiring component for electrical equipment comprising:

a plurality of bus bars;

a housing made of resin in which the plurality of bus bars are each exposed at both ends and embedded inside at an interval to each other, and a hollow portion is provided in which an opening through which an intermediate portion of each of the plurality of bus bars is exposed is formed;

a filling material made of an elastomer filled in the hollow portion and covering an entire periphery of the bus bars at least at a boundary portion between the intermediate portions and the housing; and a lid member including a lid portion that closes the opening and an embedded portion that extends from the lid portion toward the filling material and is embedded in the filling material, wherein a ridge portion protruding in a thickness direction and a groove portion recessed in the thickness direction are formed over an entire periphery of an outer edge portion of a surface of the lid portion facing the opening, and a second groove portion and a second ridge portion that are fitted to the ridge portion and the groove portion, respectively, are formed in an inner edge portion of the opening of the housing.

\* \* \* \* \*